March 20, 1951         J. C. SCHILLER ET AL         2,546,017
PROCESS FOR HYDROGENATION OF CARBON MONOXIDE
Filed Dec. 11, 1948

James C. Schiller,
Sam R. Bethea,
Max A. Mosesman,
INVENTORS.
BY
AGENT.

Patented Mar. 20, 1951

2,546,017

UNITED STATES PATENT OFFICE 2,546,017

PROCESS FOR HYDROGENATION OF CARBON MONOXIDE

James C. Schiller, Sam R. Bethea, and Max A. Mosesman, Baytown, Tex., assignors, by mesne assignments, to Standard Oil Development Company, Elizabeth, N. J., a corporation of Delaware Application December 11, 1948, Serial No. 64,744

8 Claims. (Cl. 260—449.6)

The present invention is directed to catalytic conversions in which carbon monoxide and hydrogen are involved. More particularly, the invention is concerned with a method for the catalytic hydrogenation of carbonaceous material. In its more specific aspects, the invention is directed to the catalytic synthesis of normally liquid hydrocrabons and oxygenated organic compounds from mixtures of carbon monoxide and hydrogen.

The catalysts most commonly used in the hydrogenation of carbonaceous materials such as hydrocarbons or carbon monoxide are the metals of groups VI and VIII of the periodic system and their oxides and sulfides. The former group of catalysts is more active in the hydrogenation of various types of hydrocarbon materials while the latter group is preferred in the synthesis of valuable products from carbon monoxide and hydrogen. The choice of the proper catalyst and the conditions at which it is applied depend mainly on the type of product desired.

For example, in the reaction of carbon monoxide with hydrogen, nickel catalysts may be used over a wide range of temperatures and pressures and predominantly normally gaseous hydrocarbons are produced that are useful as fuel gases of high heating value and as starting materials for further synthetic processes such as polymerization, alkylation, oxidation, etc. Cobalt type catalysts, when employed at relatively low temperatures of about 380°–450° F. and low pressures of about 1–10 atmospheres absolute permit production of predominantly saturated hydrocarbons useful as diesel oils, lubricants, paraffin wax, etc. For the synthesis of high grade motor fuels, on the other hand, iron type catalysts are more suitable particularly when used at relatively high temperature of about 450°–800° F. and pressures of about 3–100 atmospheres absolute or higher, because a predominantly unsaturated product of high octane rating is formed at these conditions.

Catalytic hydrogenation reactions in general, particularly the synthesis of hydrocarbons from CO and $H_2$, are extremely temperature sensitive and the catalyst is subject to relatively rapid deactivation mainly resulting from the deposition on the catalyst of involatile carbonaceous deposits such as wax, coke, or the like. This situation has led, in recent years, to various attempts and proposals to employ the so-called fluid catalyst technique wherein the gasiform reactants are contacted with a dense turbulent bed of finely divided catalyst fluidized by the gasiform reactants and products. The fluid technique permits catalyst replacement without interruption of the process and greatly improved temperature control and thus constitutes a suitable means for solving the aforementioned problems. However, the adaptation of hydrogenation reactions and particularly of the hydrocarbon synthesis to the fluid catalyst technique has encountered serious difficulties, particularly when iron catalysts are used.

Application of the fluid technique requires, in addition to the conventional characteristics determining catalyst activity, such as total desired yield and active catalyst life, ease of fluidization and attrition resistance. It is also desirable, for example, when iron-type synthesis catalysts are used that the catalyst be active in the temperature range above 600° F. and still be largely selective to C4 and heavier hydrocarbons, since under these conditions high octane motor fuels are obtained. None of the prior art catalysts comply satisfactorily with all of these requirements.

Synthesis catalysts are usually prepared by the reduction of various natural or synthetic metal oxides or by the decomposition of metal carbonyls, the catalytic activity being enhanced by the addition of such promoters as various compounds of alkali metals or the oxides of chromium, zinc, aluminum, magnesium, manganese, the rare earth metals and others in small amounts of about 1–10%. While some of these catalysts exhibit excellent activity characteristics, they are without exception deficient with respect to ease of fluidization, and/or attrition resistance particularly if used in commercial runs of several hundred hours' duration. Even fluidized catalysts obtained from sintered iron, which have been found to exhibit excellent fluidization and attrition characteristics show signs of disintegration in long run operations.

This general lack of mechanical resistance or steady decrease of mechanical strength during operation is particularly characteristic for iron type catalysts. It has been found to be closely connected to a high rate of carbon deposition on the catalyst, encountered at the conditions required by the synthesis using iron catalysts. The catalyst disintegration which accompanies excessive carbon deposition is believed to be the result of a migration of carbon into the iron lattice by the mechanism of interstitial carbide formation followed by decomposition of the carbide to free carbon. This process may continue until the catalyst mass contains about 99% of carbon.

It will be appreciated from the above that catalysts of satisfactory activity, selectivity to useful products, and catalyst life which may be used in commercial operation without substantial catalyst disintegration and carbon deposition are greatly needed, particularly in the synthesis art. This drawback, for example, has been the major obstacle in all attempts to apply the fluid catalyst technique to the iron-catalyzed hydrocarbon synthesis. The present invention overcomes this obstacle and affords various other advantages.

It is, therefore, the principal object of the present invention to provide an improved process for the hydrogenation of carbonaceous materials and more particularly for the catalytic conversion of carbon monoxide and hydrogen.

A further object of the present invention is to provide an improved hydrocarbon synthesis process employing fluidized catalysts which are not subject to excessive disintegration and carbon formation.

A more specific object of the invention is to provide catalysts of high disintegration resistance for use in the synthesis of hydrocarbons from carbon monoxide and hydrogen employing the fluid catalyst technique.

A still further object of the present invention is to provide an improved method for adding catalyst to supports having a high resistance to disintegration.

In accordance with the present invention, the objects are obtained by suspending a catalytic material including a support having high resistance to disintegration in a mixture of carbon monoxide and hydrogen and causing the mixture of carbon monoxide and hydrogen to react at a suitable temperature and pressure in contact with the material having a high resistance to disintegration and attrition. As the suspension is carried into a reaction zone, it has added to it a small quantity, sufficient to catalyze the reaction of carbon monoxide and hydrogen to hydrocarbons and oxygenated compounds, of a catalytic material such as salts and oxides of the elements of group VIII of the periodic table as exemplified by iron, cobalt and nickel. The catalytic compound added to the suspension may be in the form of an aqueous or alcoholic solution or suspension of the catalytic compound, or it may be added as a finely divided powder suspended in a gasiform fluid. When the catalytic compound is added as a solution, it may be pumped into the catalytic reactor at a plurality of points. Similarly, when the catalytic compound is added as a solid, it may be blown into the reactor at a pressure above the pressure obtaining in the reactor as a suspension in a mixture of carbon monoxide and hydrogen or as a suspension in an inert gaseous material. Regardless of the way the catalytic compound is injected into the catalytic reactor, is becomes associated with the inert support. When it is injected as a solution, the particles of the inert support are believed to become coated with the catalytic compound while when it is blown in as a solid the particles of solids may become admixed with the support either as a mechanical mixture or deposited thereon.

After the reaction has taken place in the reaction zone, the catalyst, unreacted material, and reacted product are discharged into a catalyst separator such as one involving the cyclone principle. The catalyst separated from the product is recycled to the process, and the product including any disintegrated catalytic material is routed to a second separator where carbonaceous fines resulting from attrition or disintegration of a portion of the catalyst and disintegrated catalytic compounds ingredient are separated from the product. The product is then cooled and discharged into a separation vessel where a separation is made. Non-condensible gaseous materials are separated and may be recycled to the process while a hydrocarbon phase containing oxygenated organic compounds is withdrawn for further treatment such as distillation and chemical treatment, and a water layer is withdrawn for recovery of valuable oxygenated organic compounds therefrom.

The oxides and salts of the elements of group VIII of the periodic table finding usage in the present invention are the oxides and salts of iron, cobalt, and nickel, or mixtures thereof. For example, iron nitrate, cobalt nitrate, nickel nitrate, and the chlorides, acetates, oxalates, bromides, bromates, and fluorides thereof, potassium, sodium, and lithium ferrate, potassium, sodium, and lithium trioxalatoferriates, potassium, sodium, and lithium cobaltiates, and the like may be injected as solids or as solutions thereof in the practice of our invention. Compounds finding particular usage in our invention are iron nitrate, iron oxides as $Fe_2O_3$, either in the gamma or alpha form, $Fe_3O_4$ (ferro-ferric oxide), potassium ferrate, potassium trioxalatoferriate, and the like.

Temperatures employed in the reaction in accordance with the present invention may vary from about 350° F. up to about 800° F., with a preferred temperature range from about 400° to about 700° F., depending on the catalyst employed and the products desired. Pressures may vary over a wide range. For example, low pressures of about one atmosphere or pressures ranging upwardly to about 800 pounds per square inch may be used. Ordinarily, a pressure of about 150 to about 600 pounds per square inch may be employed.

The carrier material for the catalyst may be selected from a rather large group of substances containing silica and alumina. For example, compounds which are stable, fluidizable, and non-disintegrating may be employed in the practice of our invention. Such compounds include the aluminate spinels of the metals of group II of the periodic table, the natural clays such as the bentonitic clays comprising the montmorillonites, kaolins, and bauxite. In addition to compounds containing silica and alumina, the group II metal oxides such as zinc oxide, barium oxide, cadmium oxide, and the like, may also be used satisfactorily as supports. Examples of the aluminate spinels of group II metals comprise zinc aluminate, cadmium aluminate, and other members of the same series. The bentonites may include either the sodium or calcium montmorillonites while bauxite may be used in the crude or purified form. As a general rule, the carrier materials as illustrated above are in the basic and neutral condition and are more desirable than are amphoteric and acidic type supports.

The amount of the catalytic compound added to the reaction zone in accordance with the present invention may vary from about 0.1 to about 10% of the supported material circulating in the system. Usually an amount in the range from about 1 to 5% by weight of the catalyst circulating in the system will give satisfactory results.

The catalyst employed in the present invention will ordinarily be used in conjunction with a promotional material to enhance the activity of the catalyst. Such promoters may include the alkali and alkaline metal compounds such as the oxides, hydroxides, carbonates and salts thereof. Illustrative of the compounds which may find use as promoters in the reaction are the oxides, hydroxides and carbonates of lithium, sodium, potassium, the oxides, carbonates and salts of calcium, zinc, magnesium, strontium, cadmium and barium. Similarly, the ferrates of potassium, sodium and lithium, the trioxalatoferriates of potassium, sodium and lithium, and the like, may be used as promoters when other salts besides these materials such as, for example, iron nitrate are employed as a catalytic material on the support. On the other hand, if potassium ferrate and the like are employed as catalytic materials, it ordinarily will not be necessary to employ a promoter.

The carbon monoxide and hydrogen may be employed in equimolecular mixture or may be employed in amounts ranging in ratios from 1:1 to 2:1 of carbon monoxide and hydrogen.

The invention will be further illustrated by reference to the drawing in which

Figure 1:
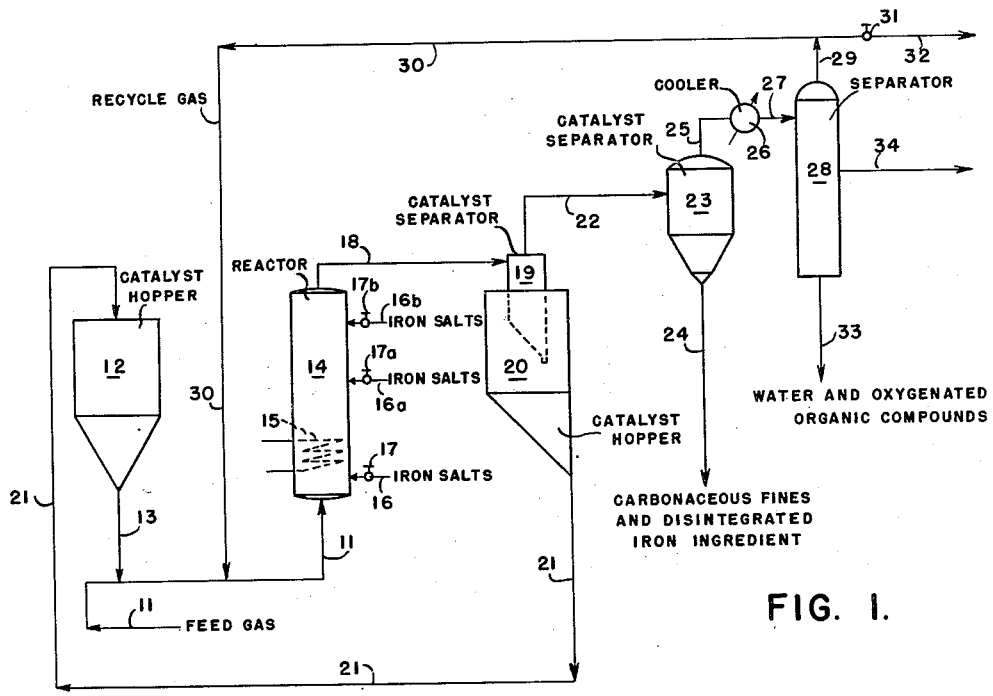
Fig. 1 is a flow diagram of a preferred mode thereof.

Referring now to the drawing, and particularly to Fig. 1, numeral 11 designates a charge line through which a feed gas mixture comprising carbon monoxide and hydrogen in the ratio of 1:1, for example, is introduced into the system from a source not shown. The carbon monoxide and hydrogen may be heated prior to injection or the heat for reaction may be provided at least in part from the catalyst material including support and catalytic compounds which is introduced from catalyst hopper 12 and line 13 into line 11 wherein a suspension is formed of the catalytic material in the feed gas. This suspension is then routed by line 11 into reactor 14 provided with an internal cooling means illustrated by coil 15 to remove the considerable amount of heat liberated by the exothermic reaction. As the suspension passes into the reactor 14 there may be injected thereto an amount of a catalytic compound either as a solid or as a solution thereof by way of line 16 controlled by valve 17 from a source not shown. The catalytic compound, which may be a solution of iron nitrate, is introduced into the reactor 14 through line 16 and intermingles with the suspension and becomes associated with the solid particles carried in the suspension. The amount of catalytic compounds introduced is sufficient to cause the reaction to proceed, the reactor 14 being of sufficient size and capacity to allow a residence time sufficient for the reaction. Additional amounts of catalytic compounds may be introduced into reactor 14 by lines 16a and 16b controlled, respectively, by valves 17a and 17b or only a portion of the catalytic compounds may be introduced by line 16 and the remainder of the amount required introduced by lines 16a and 16b. The catalytic material may be introduced continuously or intermittently. The suspension including catalytic compound and support then passes upwardly in reactor 14 and outwardly therefrom by line 18 which discharges into a catalyst separator 19 located in the upper portion of a second catalyst hopper 20.

In catalyst separator 19, which may be a cyclone separator, the major portion of the catalytic material including catalytic compounds and support is separated from the products of the reaction and non-reacted material and drops downwardly into hopper 20 and from thence is recirculated by line 21 to hopper 12 for reuse in the process as has been described. The product including hydrocarbon, oxygenated organic compounds, and unreacted gases and a small amount of disintegrated catalytic material and carbonaceous fines discharges by line 22 into a second catalyst separator 23 which may be of the cyclone type or may be a Cottrell precipitator as required. Catalyst separator 23 may be a combination of a separator of the cyclone type and Cottrell precipitator. In any event, separator 23 is operated to recover from the product stream substantially all carbonaceous fines and disintegrated catalytic component which drops downwardly therefrom and is withdrawn by line 24 and recovered for further treatment as may be desired. The product is then discharged from catalyst separator 23 by line 25 into a cooler 26 where its temperature is reduced to cause condensation and liquefaction of condensible hydrocarbons, oxygenated organic compounds, and water resulting from the reaction. The cooled and condensed product then discharges from cooler 26 by line 27 into a separator 28 which may, if desired, be of the vertical type. From separator 28 uncondensible gases are withdrawn by line 29 and may be recycled to reactor 14 at least in part by line 30 or may be discharged from the system by opening valve 31 in line 32 for further use as may be required or desired.

It will be seen that a particular feature of the present invention wherein carbonaceous material and disintegrated catalyst are removed in separator 23 is that the catalyst need not be regenerated since the inactive material and carbonaceous matter are continuously removed and activating material is continuously injected into the reaction zone at a single or a plurality of points as may be desired. Although continuous injection may be preferred to maintain catalyst activity, it is within the purview of our invention to inject the catalytic material intermittently as desired, either at a single or plurality of points.

In separator 28 two liquid phases result, one comprising hydrocarbons formed in the reaction and the other comprising water and water soluble oxygenated organic compounds. The hydrocarbon phase will also include oxygenated organic compounds and especially those predominantly soluble in hydrocarbon. The water phase containing dissolved oxygenated organic compounds may be withdrawn from the system by line 33 for treatment and recovery of the valuable oxygenated organic compounds which may include organic acids, ketones, aldehydes, esters, and the like.

The liquid hydrocarbon product is withdrawn from separator 28 by line 34 and may be routed to a treating operation including chemical treatment and physical separations. Such chemical treatment and physical separations may include solvent extraction, treatment with various chemical reagents, distillation, and the like, or a combination thereof. The liquid hydrocarbon product withdrawn by line 34 will generally include hydrocarbons having 4 or more carbon atoms in the molecule and similar oxygenated organic compounds. The hydrocarbon product may contain olefins, paraffins including isoparaffins, aromatics, naphthenes, and the like, while the oxygenated organic compounds dissolved therein may include the organic acids, ketons, aldehydes, esters, and other oxygen-containing organic compounds.

Figure 2:
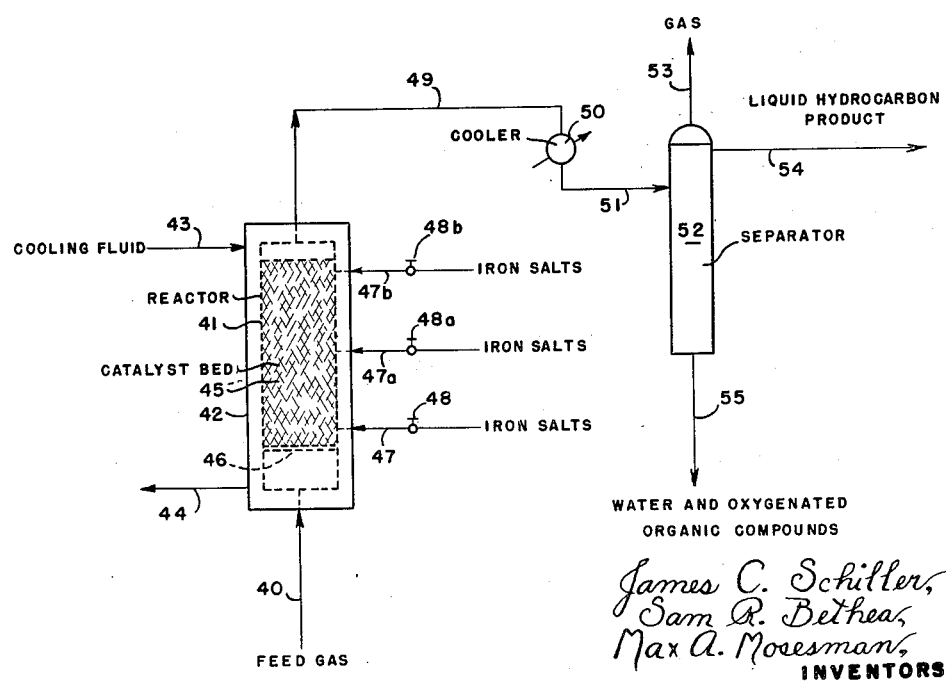
Fig. 2 is a flow diagram of another mode for practicing our invention in a fixed bed of catalyst.

Another mode of practicing our invention will now be described with reference to Fig. 2 in which numeral 40 designates a charge line through which a feed gas of equal parts of carbon monoxide and hydrogen at a temperature in the range given heretofore is introduced into the system from a source not shown. The feed gas mixture is discharged into the bottom portion of a reaction zone 41 which is surrounded by a jacket 42 through which a cooling fluid may be circulated.

The cooling fluid which may be water or any heat conducting material may be introduced into jacket 42 and into the space defined by the jacket and the reaction zone 41 by way of inlet 43 and may be removed by outlet 44. Jacket 42 through which a cooling fluid is circulated serves to remove heat liberated in the exothermic reaction.

The feed gas discharges into reactor 41 and flows upwardly through bed 45 of a catalyst of the type mentioned before which is shown as a shaded portion. Catalyst bed 45 is formed on a grid plate 46. For example, it may be assumed that bed 45 comprises a catalyst including zinc aluminate containing a small amount of potassium ferrate. The feed mixture flows upwardly through bed 45. Potassium ferrate may be injected as an alcoholic suspension through either of lines 47, 47a or 47b controlled respectively by valves 48, 48a and 48b. It will thus be seen that provision is made to introduce the iron salts at a single or a plurality of points. Thus it is possible to inject continuously or intermittently the iron salts into the bed 45 and to provide a catalytically active catalyst at all times. The feed mixture in bed 45 is allowed to remain in contact therewith a time sufficient for the reaction to proceed to completion. The reaction products, including unreacted gases, hydrocarbons, oxygenated organic compounds and water are removed from bed 45 by line 49 and are discharged thereby into a cooler 50 wherein the temperature is reduced sufficiently to cause condensation and liquefaction of the condensable material in the reaction products. The cooled and condensed product then discharges by line 51 into a separator 52 in which the product separates into three phases, a gas phase, a liquid hydrocarbon phase and a water phase. The gas phase may be withdrawn by line 53 and recycled wholly or in part to the feed gas mixture in line 40 or it may be discharged by line 55 and may be treated for recovery of valuable oxygenated organic compounds. The hydrocarbons and oxygenated organic compounds contained in the layers withdrawn by lines 54 and 55 will be similar to those obtained in the mode described with respect to Fig. 1.

When conducting the process of the present invention either in a fixed bed or as a suspension, it will be apparent that the catalyst may be prepared originally by soaking the catalytic support in a solution or suspension of the salts and/or other compounds employed but the activity thereof may be maintained by injecting the catalytic solution as the reaction progresses over a period of time.

The hydrocarbons contained in the liquid product are suitable for use as motor fuels, both gasoline and Diesel, and the olefin content thereof make it a suitable feed stock for alkylation, polymerization, and other conversion operations, either catalytic or non-catalytic. For example, if the light hydrocarbons contained in the liquid hydrocarbon product are predominantly normally paraffinic in nature, selected fractions of the feed may be subjected to a catalytic isomerization operation. The type of catalytic conversion to which the liquid hydrocarbon product may be put may depend on the type of hydrocarbon present and the type of product desired.

In order to illustrate the invention further, the following examples are given:

Example 1

A catalyst was prepared by admixing zinc aluminate with 5% potassium carbonate. Ninety-five parts of this mixture and 5 parts of iron from iron nitrate were subjected to treatment with 1000 volumes of hydrogen per volume of catalyst per hour for 24 hours at 700° F. following which the flow of hydrogen was terminated and the temperature reduced to a temperature in the range between 600° and 650° F. A mixture of equal parts of carbon monoxide and hydrogen was then passed over the catalyst at a pressure of 150 pounds per square inch and a feed rate of 200 volumes of feed per volume of catalyst per hour. Over a period of 72 hours, substantial quantities of hydrocarbons and water including oxygenated organic compounds were produced. A small amount of carbon was produced which was separate and distinct from the bulk of the catalyst and which had caused no discernible disintegration or expansion thereof.

Example 2

The catalyst employed in Example 1, after pretreatment with hydrogen, had its temperature reduced to 400° F. and was subjected to an additional treatment with carbon monoxide at 400° F. After this time, the flow of carbon monoxide was terminated and the temperature of the catalyst raised to a temperature in the range between 625° and 700° F. and an equi-molecular mixture of carbon monoxide and hydrogen was then contacted with the catalyst at a feed rate of 200 volumes of feed per volume of catalyst per hour at 150 pounds per square inch gauge pressure. Over a period of 168 hours amounts of hydrocarbon and water appreciably greater than that of the operation in accordance with Example 1 were obtained. As in Example 1, a small amount of carbon was observed which had not caused any apparent disintegration of the catalyst.

Example 3

The catalyst employed in this run was similar to that employed in Example 2 with the exception that it was treated with carbon monoxide at 500° F. for 4 hours rather than at 400° F. In this run carbon monoxide and hydrogen were contacted with the catalyst at a temperature in the range between 600° and 700° F. for a period of 208 hours at 150 pounds per square inch pressure and at a feed rate of 200 volumes of feed gas per volume of catalyst per hour. Under these conditions the amount of hydrocarbon and water including oxygenated organic compounds was more than double the amount produced in Example 2. The amount of carbon produced in this run was also small and without observable deleterious effects on the catalyst.

Example 4

A catalyst was prepared from zinc aluminate containing 5% potassium carbonate; 99% of this mixture and 1% of iron oxide was pretreated with 1000 volumes of hydrogen per volume of catalyst per hour for 24 hours at 700° F. After this period of time, the flow of hydrogen was terminated and the temperature of the catalyst reduced to 650° F. and a mixture of carbon monoxide and hydrogen contacted with the catalyst for 96 hours, during which time substantial quantities of hydrocarbon and water including oxygenated organic compounds were produced. Similar to the previous runs, a small amount of carbon was obtained. This carbon had not caused any discernible detrimental effects on the catalyst.

It will be seen from the foregoing examples that catalysts of high disintegration resistant material to which is added small amounts of iron salts and iron oxides are active in synthesizing hydrocarbon and oxygenated organic compounds without formation of appreciable amounts of deleterious carbon.

When employing the process of the present invention in the fluidized technique, the catalytic materials given above should have particle sizes ranging from about 10 microns to about 150 microns with a major portion having particle sizes in the range from about 20 to 100 microns. The superficial velocities employed in the reactor 14 may range from about 0.3 to about 5 feet per second with bed densities of about 30 to 100 pounds per cubic foot. The recycle ratios of the recycle gas may vary rather widely from about 0.5 to about 4.0.

Fluid operation in hydrocarbon synthesis in accordance with the present invention has an outstanding advantage over the fixed bed operation in that the concentration of catalyst throughout the reaction may be maintained substantially uniform as a result of the high turbulence of the fluidized bed. Furthermore, fluidized operation by virtue of the dispersion of the catalyst throughout the suspending medium allows the heat of reaction to be distributed uniformly and to be removed by means of the cooling means 15 shown adjacent the inlet of reactor 14.

While not described in the foregoing description of our invention, it will be understood that it may be necessary to subject at least the catalytic material to oxidizing and reducing treatment. Ordinarily, the catalyst will be sufficiently reduced in contact with a mixture of carbon monoxide and hydrogen during the preliminary part of the reaction. However, it is to be understood to be within the scope of our invention to treat the catalytic material injected into the reaction zone or treat the catalytic material plus carrier under oxidizing and reducing conditions. Usually it will be desirable to conduct both the oxidation and reduction operations prior to the introduction of the catalytic material into the reaction. However, it may be desirable under some conditions to conduct the oxidation and reducing treatment of the catalytic material in conjunction with the carrier material in the reaction chamber.

The nature and objects of the present invention having been completely described and illustrated, what we wish to claim as new and useful and to secure by Letters Patent is:

1. A method for synthesizing hydrocarbons and oxygenated organic compounds which comprises forming a feed mixture of carbon monoxide and hydrogen, contacting said mixture in a reaction zone with a catalyst initially comprising a minor amount not over 10% by weight of catalytic material which is susceptible to disintegration during said contacting selected from the oxides and salts of iron and a major amount of a solid zinc aluminate carrier material having a high resistance to disintegration, continually introducing said catalytic material into said reaction zone separately from said carrier to maintain a catalytic amount not over 10% by weight of said catalytic material on said carrier, at a reaction temperature in a range between 350° and 800° F. and at a pressure in a range from about atmospheric to about 800 pounds per square inch to form a product including hydrocarbons and oxygenated organic compounds and disintegrated catalytic material and continuously recovering said product and discarding said disintegrated catalytic material.

2. A method for synthesizing hydrocarbons and oxygenated organic compounds which comprises suspending a catalyst initially comprising not over 10% by weight of a catalytic material susceptible to disintegration selected from the oxides and salts of iron and a major amount of a solid zinc aluminate carrier material having a high resistance to disintegration, in a feed mixture of carbon monoxide and hydrogen, heating said suspension to a temperature in the range between 350° and 800° F. and maintaining said suspension at a pressure in the range between 15 and 800 pounds per square inch in a reaction zone, whereby at least a portion of said catalytic material is disintegrated, continually injecting into said reaction zone separately from said carrier an amount not over 10% by weight of said catalytic material sufficient to maintain the catalytic activity of said catalyst, forming a product from said feed mixture, and continuously recovering said product and disintegrated catalytic material from said suspension and discarding said disintegrated catalytic material.

3. A method in accordance with claim 2 in which the catalytic material injected into the reaction zone is introduced as a solution.

4. A method in accordance with claim 2 in which the catalytic material injected into the reaction zone is introduced as a finely divided solid.

5. A method for synthesizing hydrocarbons and oxygenated organic compounds which comprises suspending a catalyst initially comprising not over 10% by weight of a catalytic material susceptible to disintegration selected from the oxides and salts of iron and a major amount of a solid zinc aluminate carrier material having a high resistance to disintegration, in a feed mixture of carbon monoxide and hydrogen, heating said suspension to a temperature in the range between 350° and 800° F. and maintaining said suspension at a pressure in the range between 15 and 800 pounds per square inch in a reaction zone, whereby at least a portion of said catalytic material is disintegrated, continually injecting into said reaction zone separately from said carrier material and at a plurality of points an amount of said catalytic material not over 10% by weight sufficient to maintain the catalytic activity of said catalyst, forming a product from said feed mixture, and continuously recovering said product and disintegrated catalytic material from said suspension and discarding said disintegrated catalytic material.

6. A method in accordance with claim 1 in which the amount of the catalytic material is in the range from about 0.1% to 5% by weight.

7. A method in accordance with claim 2 in which the catalytic material is present in an amount in the range from about 0.1% to 5% by weight.

8. A method in accordance with claim 5 in which the catalytic material is present in an amount in the range from about 0.1% to 5% by weight.

JAMES C. SCHILLER.
SAM R. BETHEA.
MAX A. MOSESMAN.

REFERENCES CITED

The following references are of record in the file of this patent:

UNITED STATES PATENTS

| Number | Name | Date |
|---|---|---|
| 2,346,294 | Danforth | Apr. 11, 1944 |
| 2,355,831 | Voorhees | Aug. 15, 1944 |
| 2,361,997 | Dreyfus | Nov. 7, 1944 |
| 2,407,918 | Burgin | Sept. 17, 1946 |
| 2,423,833 | Hirsch | July 15, 1947 |
| 2,424,467 | Johnson | July 22, 1947 |
| 2,464,480 | Beck et al. | Mar. 15, 1949 |
| 2,479,439 | Voorhies, Jr. | Aug. 16, 1949 |
| 2,480,341 | Seelig | Aug. 30, 1949 |